United States Patent Office 3,338,800
Patented Aug. 29, 1967

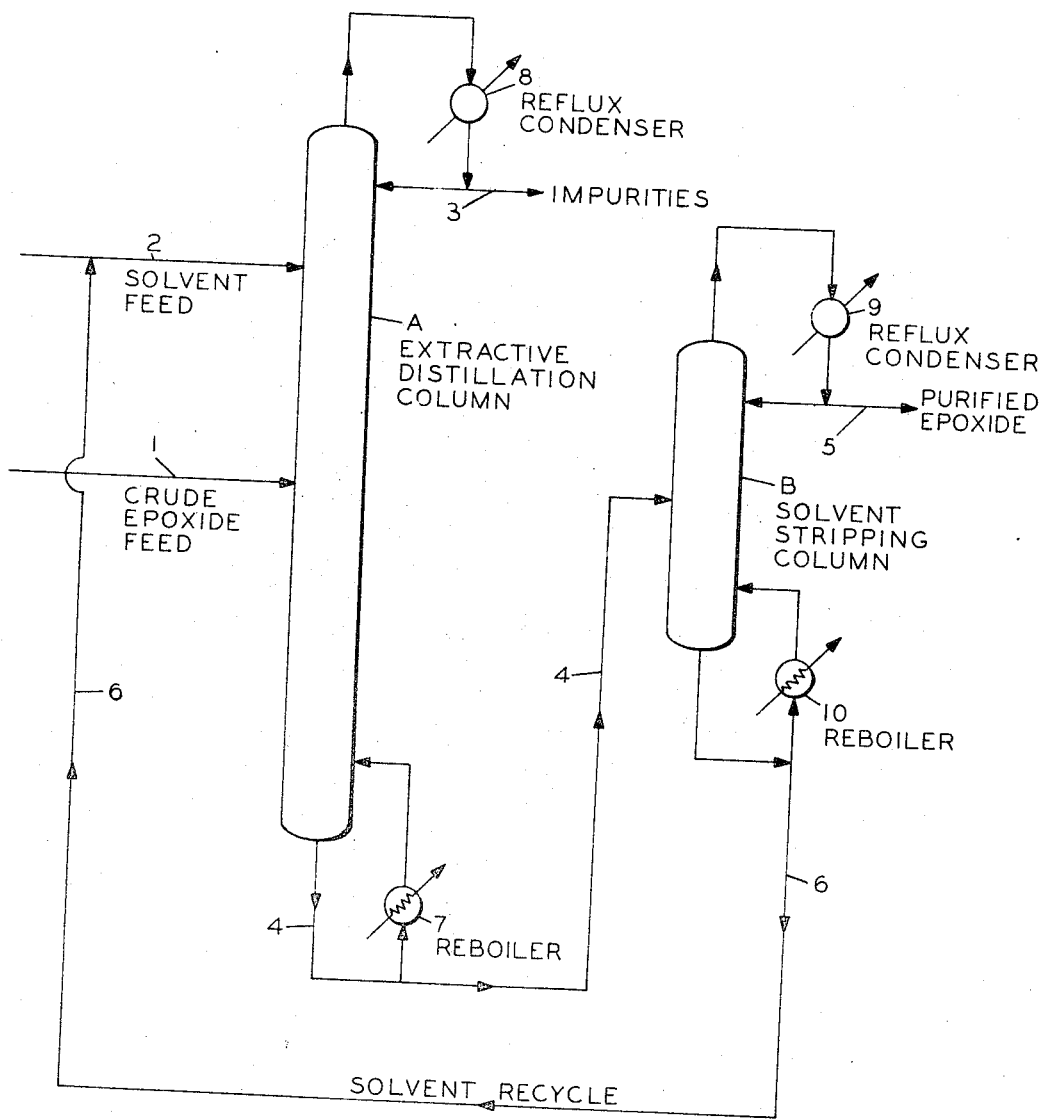

3,338,800
EXTRACTIVE DISTILLATION OF OLEFIN OXIDES WITH A PARAFFIN OR PARAFFIN NAPHTHA SOLVENT
Robert C. Binning, St. Louis, and Glen F. Crum, Kirkwood, Mo., assignors to Monsanto Company, St. Louis, Mo., a corporation of Delaware
Filed Feb. 12, 1964, Ser. No. 344,174
11 Claims. (Cl. 203—52)

This invention relates to a process for the recovery and purification of olefin oxides.

More particularly, the present invention relates to the recovery of olefin oxides from crude mixtures of oxygenated compounds and olefin oxides by an extractive distillation process.

The present invention is especially suited to the recovery from crude mixtures of oxygenated compounds of olefin oxides having from 3 to 18 carbon atoms. Of particular interest and utility is the recovery and purification of propylene oxide.

In the direct oxidation of ethylenically unsaturated compounds with molecular oxygen in the liquid phase to produce epoxides, a complex mixture of oxygenated products is formed. For example, in the molecular oxygen oxidation of propylene in the liquid phase at least 45 different products have been identified as being present in the system. The products of these oxidations include acids, alcohols, aldehydes, ketones, esters, etc., in addition to the olefin oxide. The various products are then separated by various refining trains. In order to recover and purify the desired epoxide, a number of separation operations are required. The various separation steps result in a number of crude fractions containing oxygenated impurities having similar boiling points. One of these fractions contains the desired epoxide and impurities having relatively similar boiling points which renders separation and purification of the epoxide infeasible by conventional distillation techniques. For example, in the recovery of propylene oxide a crude mixture of propylene oxide and methyl formate is obtained; this stream may also contain acetaldehyde. The propylene oxide and methyl formate components boil within 5° C. of each other, hence cannot feasibly be separated by conventional distillation.

It has been proposed in prior art processes to separate propylene oxide from crude mixtures containing methyl formate or methyl formate and acetaldehyde by various means. For example, in U.S. Patents 2,550,847 and 2,622,060 it is suggested to separate propylene oxide from methyl formate by use of aqueous inorganic saponifying agents to saponify methyl formate. The processes described in these patents are disadvantageous in that use of the saponifying agent gives rise to resinified products and salts which must be separated and discarded. It is necessary, therefore, to continuously add fresh saponifying material which materially increases control requirements and cost of operation. Moreover, the use of aqueous materials in such process requires phase separation as between the propylene oxide and the aqueous phase. To accomplish phase separation it is sometime necessary to use decanters which add to apparatus and operational requirements. A further disadvantage in using aqueous reagents is in the increased possibility of hydrolyzing the propylene oxide to propylene glycol.

Another prior art method for separating propylene oxide from methyl formate is described in U.S. Patent 3,071,601. In this method reliance is placed upon the use of azeotropic distillation separation wherein an azeotrope-former removes methyl formate overhead. A disadvantage of this process is that the azeotrope-former cannot be recycled to the azeotropic distillation column for continuous use until the azeotropic mixture has been subjected to some additional treatment to remove the methyl formate. A typical treatment necessary to remove methyl formate involves solvent extraction of the azeotrope with water. However, use of water is disadvantageous since the azeotrope-former becomes saturated with water which, when recycled to the azeotropic distillation column, interferes with operation of the column by decreasing the flood point thereof, by creating fluctuations in temperature and by tending to concentrate water in the column, thus forming two phases with the azeotrope-former on one tray. Additionally, when the azeotrope-former containing water is recycled to the column the propylene oxide therein is subject to hydrolysis to propylene glycol by the water. Another disadvantage in treating the azeotropic mixture to water extraction is that methyl formate is hydrolyzed to formic acid which when recycled to the column is highly corrosive hereof. If an extractive solvent other than water is used to separate methyl formate from the azeotrope-former, the foregoing problems still must be avoided. In addition, the extractive solvent must be relatively insoluble with the azeotrope-former.

Still a further disadvantage of using an azeotrope-former such as n-pentane is that the concentration of n-pentane used in the column must be rigorously controlled, since its boiling point is only 1° C. higher than that of propylene oxide. If too little n-pentane is used it will not entrain methyl formate; if too much is used n-pentane will be removed with the propylene oxide.

Another prior art method for treating crude mixtures of oxygenated products containing propylene oxide is described in U.S. Patent 3,039,940. The procedure described in that patent involves the extractive distillation separation of propylene oxide and methylal wherein the distillate contains a higher proportion of propylene oxide than the feed stream entering the extractive distillation column, while withdrawing as a bottoms stream the extractive distillation solvent containing most of the methylal. The procedure described in this patent is inadequate to provide, in fact is incapable of providing, a clean separation and purification of propylene oxide because methyl formate, which is produced in the oxidation process described in the patent, boils within about 3° C. of propylene oxide (1,2-). Consequently, the overhead vapors contain substantially the same proportion of methyl formate impurity relative to propylene oxide as does the feed stream to the extractive distillation column. Hence, methyl formate is not, and cannot be, separated from propylene oxide and methylal, which boils at more than 7° C. higher than propylene oxide, by the process of the above patent. Moreover, although at least 45 different oxygenated products resulting from liquid phase oxidations have been identified by applicants, using the most refined analytical apparatus and techniques, methylal has never been identified as a product of these reactions.

It is, therefore, an object of the present invention to provide a simple and economic method for the recovery and purification of olefin oxides from crude mixtures of oxygenated compounds and said olefin oxides, which method is superior to prior art methods, e.g., in avoiding such difficulties as enumerated above.

It is a further object of the present invention to provide a process for the separation of olefin oxides having from 3 to 18 carbon atoms from crude mixtures thereof together with oxygenated compounds boiling within 5° C. of said olefin oxides.

A particular object of the present invention is the separation and recovery of purified propylene oxide from a crude mixture thereof together with methyl formate or methyl formate and acetaldehyde.

These and other objects of the invention will become apparent as the description proceeds.

The invention will be better understood by reference to the accompanying figure which is a schematic drawing of the apparatus in which the instant process is performed.

In accordance with the present invention it has been discovered that olefin oxides may be recovered from crude mixtures thereof together with close-boiling oxygenated products by extractively distilling said crude mixture in the presence of certain paraffinic hydrocarbons as extractive solvents. In particular, it has been found that oxygenated impurities boiling within 5° C. of olefin oxides may be separated from said olefin oxides by use of extractive distillation using acyclic paraffinic hydrocarbons having boiling points of at least 35° C. above those of said impurities as the extractive solvents. In general, the paraffinic hydrocarbons utilized herein should have boiling points of at least 67° C.

In a particularly suitable embodiment of this invention a crude fraction containing propylene oxide and methyl formate resulting from the liquid phase oxidation of propylene with molecular oxygen is subjected to extractive distillation using pure normal heptane as extractive solvent. The methyl formate is distilled overhead while the normal heptane containing propylene oxide is removed as bottoms. The propylene oxide is readily stripped from the normal heptane in very pure form and the normal heptane is continuously recycled to the extractive distillation zone for reuse. Although crude mixtures containing propylene oxide as described in this embodiment commonly contain acetaldehyde in addition to methyl formate, the impurity methylal, reportedly formed in vapor phase oxidations, has never been detected even after extensive refining and analyses of reaction products resulting from liquid phase oxidations referred to herein.

In another preferred embodiment, a paraffinic naphtha boiling between 85° C. and 95° C. may conveniently be substituted for the normal heptane described above.

In general, the present invention contemplates the separation and recovery of any olefin oxide having from 3 to 18 carbon atoms from crude mixtures containing the same together with oxygenated impurities boiling within 5° C. of said olefin oxide. In this manner the epoxides of such olefins as the following are recovered: propylene, butenes, pentenes, hexenes, heptenes, octenes, nonenes, dodecenes, pentadecenes, heptadecenes and octadecenes. Of particular interest, utility and convenience is the separation of epoxides having from 3 to 8 carbon atoms. Included are the epoxides of alkyl-substituted olefins such as 2-methyl-1-butene, 2-methyl-2-butene, 4-methyl-2-pentene, 2-ethyl-3-methyl-1-butene, 2,3-dimethyl-2-butene and 2-methyl-2-pentene. Epoxides of the following olefinic compounds are also recoverable according to this invention: isobutylene, conjugated and unconjugated dienes including the butadienes, e.g. 1,3-butadiene, isoprene, other pentadienes, hexadienes, heptadienes, octadienes, decadienes, dodecadienes, styrene and octadecadienes.

Paraffinic hydrocarbons suitable for use as extractive solvents herein include both individual paraffins having from 6 to 18 carbon atoms and mixtures thereof. Exemplary paraffins include straight chain paraffins such as hexane, heptane, octane, nonane, decane, dodecane, pentadecane and octadecane. Suitable branch chain isomers of paraffins boiling above n-hexane include 2- and 3-methyl hexanes, 2,2-, 2,4- and 3,3-dimethyl pentanes, 3-ethyl pentane, 2,2,3-tri-methyl butane, 2,2,3,3-tetramethyl butane, 2,2,3-, 2,2,4-, 2,3,3- and 2,3,4-trimethyl pentanes, 2-methyl-3-ethyl pentane, 2,3-dimethyl hexane, 3,4-dimethyl pentane, 2-, 3- and 4-methyl heptanes, 2-methyl nonane, 2,6-dimethyl octane, 2,4,5,7-tetramethyl octane and the like.

In addition to straight and branch chain paraffins, mixtures of such paraffins are suitable herein. For example, various paraffinic naphthas are suitable. Typical paraffinic naphthas include selected fractions of straight-run gasolines and kerosenes. Other paraffinic naphthas include selected hydrogenated fractions of polygas and other low molecular weight propylene polymers (e.g., propylene tetramers and pentamers), as well as selected hydrogenated and alkylated fractions of naphthas obtained from thermal cracking and catalytic cracking of gas oils. Still other paraffinic naphthas include selected fractions of Udex raffinates (derived from solvent extractions using, e.g., diethylene glycol) from various reforming operations. For example, a particularly suitable paraffinic naphtha useful as extractive solvent in the extractive distillation separation of propylene oxide from methyl formate is a $C_7$–$C_8$ fraction of Udex raffinate. The paraffinic naphthas used herein may contain small amounts of naphthenes, olefins and aromatics derived from reforming operations without adverse effects; however, for best results these associated hydrocarbons should not exceed about 15 weight percent based on said naphtha.

The selection of a particular paraffinic hydrocarbon extractive solvent will depend primarily upon the boiling points of the particular epoxide and oxygenated impurities associated therewith as described supra.

As noted above, the acyclic paraffinic hydrocarbons suitable as extractants herein are those having a boiling point at least 35° C. higher than the boiling point of the particular impurity(s) boiling within 5° C. of the olefin oxide in a crude mixture containing oxygenated impurities. These hydrocarbons, moreover, should boil at no less than 67° C. In general the upper boiling point of hydrocarbon solvents used is limited only by practical engineering considerations. A preferred boiling point range for hydrocarbons used herein is from 67° C. to 250° C.

Use of the extractive solvents as defined herein in the extractive distillation separation of olefin oxides has numerous superior features, e.g., increased separation enhancement, ease of separation of the olefin oxide from the extractive solvent, freedom from corrosion problems and economy.

The extractive distillation process of the present invention may be performed either in batch or continuous operation. Preferably, from a standpoint of commercial operation, the process is performed continuously.

In a typical operation, the crude feed containing the olefin oxide to be separated and purified and oxygenated impurities associated therewith is fed to an intermediate point of the extractive distillation column. The paraffinic hydrocarbon extractive solvent is fed to a higher region of the column. The column is heated by means of a reboiler at base thereof. The overhead vapors from the column comprise essentially all of the oxygenated impurities boiling within 5° C. of the olefin oxide. These vapors are condensed and refluxed to the column while a portion is removed as distillate product. Bottoms from the column comprising essentially the paraffinic hydrocarbon extractive solvent containing the olefin oxide are withdrawn through a reboiler and fed to an olefin oxide refining column where the olefin oxide is stripped from the extractive solvent and taken overhead in purified form. The extractive solvent is removed as bottoms from the olefin oxide refining column and continuously recycled to the extractive distillation column.

The ratios of paraffinic hydrocarbon to crude feed are not critical herein and may be varied considerably. For example, ratios of 1:1 to 15:1 may suitably be used, although ratios within the range of 5:1 to 10:1 are preferred.

Temperatures and pressures used in the extractive distillation column may be varied over wide ranges. In general, temperatures at the reboiler should be such that the olefin oxide content in the extractive solvent withdrawn as bottoms will be maintained at a maximum. Preferably, the column is operated at atmospheric pressures although subatmospheric and superatmospheric pressures may also be used.

The following examples illustrate specific embodiments of the present invention, reference being made to the accompanying drawing:

Example 1

A crude mixture containing approximately 78% by weight of 1,2-propylene oxide, 13% of methyl formate, 9% acetaldehyde and traces of water, methanol and unknowns was introduced through line 1 at the rate of 412.9 grams per hour at the 25th tray from the top of a 2 inch diameter Oldershaw distillation column, A, containing 51 trays, while 6000 grams per hour of n-heptane was simultaneously introduced at the 6th tray from the top of the column through line 2. Heat was supplied to the column so that the temperature was maintained at about 37° C. at the top of the column, at about 48° C. at the crude mixture feed tray, and at about 76° C. at the reboiler, 7. The reflux ratio was kept at about 40 to 1 through condenser 8.

The overhead product taken through line 3 consisted of about 58% by weight of methyl formate, 39% by weight of acetaldehyde and 3% propylene oxide. Bottoms from the extractive distillation column containing only n-heptane and propylene oxide (of substantially the same quantity of propylene oxide in the crude feed) was fed simultaneously through line 4 to the 15th tray from the top of another Oldershaw column, B, of 2 inch diameter and containing 26 total trays. This column was operated at a reflux ratio of 7 to 1 through condenser 9. Heat was supplied to the reboiler, 10, to maintain an overhead temperature of 35° C., a feed tray temperature of 90° C. and a reboiler temperature of 99° C. The overhead product taken through line 5 consisted of 99.9+% by weight of 1,2-propylene oxide. The bottoms product of this solvent stripping column was removed through line 6 and continuously recycled via line 2 back to the solvent feed tray of the extractive distillation column. Trace impurities were removed in the overhead product of each of these columns. Trace impurities in the following examples are removed in the same manner, utilizing the same apparatus described in Example 1.

Example 2

A crude mixture containing approximately 78% by weight of 1,2-propylene oxide, 13% of methyl formate, 9% acetaldehyde and traces of water, methanol and unknowns is introduced at the rate of 385 grams per hour at the 25th tray from the top of a 2 inch diameter Oldershaw distillation column containing 51 trays, while 5500 grams per hour of a $C_7$-$C_8$ Udex raffinate (B.P. 85-95° C.) as extractant are simultaneously introduced at the 6th tray from the top of the column. Heat is supplied to the column so that the temperature is maintained at about 35° C. at the top of the column, at about 46° C. at the crude mixture feed tray, and at about 68° C. at the reboiler. The reflux ratio is kept at about 45 to 1.

The overhead product contains about 57% by weight of methyl formate, 40% by weight of acetaldehyde and 4% propylene oxide. Bottoms from the extractive distillation column containing only the $C_7$-$C_8$ raffinate and propylene oxide (of substantially the same quantity of propylene oxide in the crude feed) are fed simultaneously to the 15th tray from the top of another Oldershaw column of 2 inch diameter and containing 26 total trays. This column is operated at a reflux ratio of 7.5 to 1. Heat is supplied to the reboiler to maintain an overhead temperature of 35° C., a feed tray temperature of 82° C. and a reboiler temperature of 90° C. The overhead product consists essentially of 99.9+% by weight of 1,2-propylene oxide. The bottoms product of this solvent stripping column in continuously recycled back to the solvent feed tray of the extractive distillation column.

Example 3

A crude mixture containing approximately 85% by weight of isobutylene oxide, 5% of ethyl formate, 10% propionaldehyde and traces of unknowns is introduced at the rate of 400 grams per hour at the 25th tray from the top of a 2 inch diameter Olershaw distillation column containing 51 trays, while 6200 grams per hour of n-octane are simultaneously introduced at the 6th tray from the top of the column. Heat is supplied to the column so that the temperature is maintained at about 62° C. at the top of the column, at about 74° C. at the crude mixture feed tray, and at about 108° C. at the reboiler. The reflux ratio is kept at about 40 to 1.

The overhead product contains about 32% by weight of ethyl formate, 63% by weight of propionaldehyde and 6% isobutylene oxide. Bottoms from the extractive distillation column containing only n-octane and isobutylene oxide (of substantially the same quantity of isobutylene oxide in the crude feed) are fed simultaneously to the 15th tray from the top of another Oldershaw column of 2 inch diameter and containing 26 total trays. This column is operated at a reflux ratio of 5 to 1. Heat is supplied to the reboiler to maintain an overhead temperature of 53° C., a feed tray temperature of 114° C. and a reboiler temperature of 125° C. The overhead product consists essentially of 99.9+% by weight of isobutylene oxide. The bottoms product of this solvent stripping column is continuously recycled back to the solvent feed tray of the extractive distillation column.

Example 4

A crude mixture containing approximately 78% by weight of 1,2-propylene oxide, 13% of methyl formate, 9% acetaldehyde and traces of water, methanol and unknowns is introduced at the rate of 385 grams per hour at the 25th tray from the top of a 2 inch diameter Oldershaw distillation column containing 51 trays, while 5000 grams per hour of a butylene alkylate (B.P. 95-105° C.) are simultaneously introduced at the 6th tray from the top of the column. Heat is supplied to the column so that the temperature is maintained at about 38° C. at the top of the column, at about 49° C. at the crude mixture feed tray, and at about 78° C. at the reboiler. The reflux ratio is kept at about 35 to 1.

The overhead product contains about 57% by weight of methyl formate, 40% by weight of acetaldehyde and 3% propylene oxide. Bottoms from the extractive distillation column containing only butylene alkylate and propylene oxide (of substantially the same quantity of propylene oxide in the crude feed) are fed simultaneously to the 15th tray from the top of another Oldershaw column of 2 inch diameter and containing 26 total trays. This column is operated at a reflux ratio of 6.5 to 1. Heat is supplied to the reboiler to maintain an overhead temperature of 35° C., a feed tray temperature of 91° C. and a reboiler temperature of 100° C. The overhead product consists essentially of 99.9+% by weight of 1,2-propylene oxide. The bottoms product of this solvent stripping column is continuously recycled back to the solvent feed tray of the extractive distillation column.

Example 5

A crude mixture containing approximately 90% by weight of octylene oxide, 5% octanal, 2% 4-octanone, 3% methyl enanthate and traces of unknowns is introduced at the rate of 200 grams per hour at the 25th tray from the top of a 2 inch diameter Oldershaw distillation column containing 51 trays, while 3000 grams per hour of a kerosene fraction boiling between 220° C. and 230° C. are simultaneously introduced at the 6th tray from the top of the column. Heat is supplied to the column so that the temperature is maintained at about 183° C. at the top of the column, at about 194° C. at the crude mixture feed tray, and at about 218° C. at the reboiler. The reflux ratio is kept at about 45 to 1.

The overhead product contains about 48% by weight octanal, 29% by weight methyl enanthate, 19% 4-octanone and 5% octylene oxide. Bottoms from the extractive distillation column containing only the kerosene solvent and octylene oxide (of substantially the same quantity of octylene oxide in the crude feed) are fed simultaneously to the 15th tray from the top of another Oldershaw column of 2 inch diameter and contaning 26 total trays. This column is operated at a reflux ratio of 5.5 to 1. Heat is supplied to the reboiler to maintain an overhead temperature of 148° C., a feed tray temperature of 182° C. and a reboiler temperature of 201° C. The overhead product consists essentially of 99.9+% by weight of octylene oxide. The bottoms product of this solvent stripping column is continuously recycled back to the solvent feed tray of the extractive distillation column.

*Example 6*

A crude mixture containing approximately 90% by weight of octylene oxide, 5% octanal, 3% methyl enanthate, 2% 4-octanone and traces of unknowns is introduced at the rate of 200 grams per hour at the 25th tray from the top of a 2 inch diameter Oldershaw distillation column containing 51 trays, while 3000 grams per hour of tridecane are simultaneously introduced at the 6th tray from the top of the column. Heat is supplied to the column so that the temperature is maintained at about 159° C. at the top of the column, at about 173° C. at the crude mixture feed tray, and at about 200° C. at the reboiler. The reflux ratio is kept at about 30 to 1.

The overhead product contains about 48% by weight octanal, 29% by weight methyl enanthate, 19% 4-octanone and 5% octylene oxide. Bottoms from the extractive distillation column containing only tridecane and octylene oxide (of substantially the same quantity of octylene oxide in the crude feed) are fed simultaneously to the 15th tray from the top of another Oldershaw column of 2 inch diameter and containing 26 total trays. This column is operated at a reflux ratio of 5 to 1. Heat is supplied to the reboiler to maintain an overhead temperature of 143° C., a feed tray temperature of 189° C. and a reboiler temperature of 209° C. The overhead product consists essentially of 99.9+% by weight of octylene oxide. The bottoms product of this solvent stripping column is continuously recycled back to the solvent feed tray of the extractive distillation column.

*Example 7*

A crude mixture containing approximately 90% by weight of styrene oxide, 5% of phenyl acetate, 5% phenylacetaldehyde and traces of unknowns is introduced at the rate of 200 grams per hour at the 25th tray from the top of a 2 inch diameter Oldershaw distillation column containing 51 trays, while 3000 grams per hour of tridecane are simultaneously introduced at the 6th tray from the top of the column. Heat is supplied to the column so that the temperature is maintained at about 170° C. at the top of the column, at about 183° C. at the crude mixture feed tray, and at about 201° C. at the reboiler. The reflux ratio is kept at about 40 to 1.

The overhead product contains about 48% by weight phenyl acetate, 48% by weight phenylacetaldehyde and 5% styrene oxide. Bottoms from the extractive distillation column containing only tridecane and styrene oxide (of substantially the same quantity of styrene oxide in the crude feed) are fed simultaneously to the 15th tray from the top of another Oldershaw column of 2 inch daimeter and containing 26 total trays. This column is operated at a reflux ratio of 6.5 to 1. Heat is supplied to the reboiler to maintain an overhead temperature of 163° C., a feed tray temperature of 194° C. and a reboiler temperature of 210° C. The overhead product consists essentially of 99.9+% by weight of styrene oxide. The bottoms product of this solvent stripping column is continuously recycled back to the solvent feed tray of the extractive distillation column.

*Example 8*

A crude mixture containing approximately 88% by weight of butadiene monoxide, 7% methacrolein, 5% methanol and traces of unknowns is introduced at the rate of 300 grams per hour at the 25th tray from the top of a 2 inch diameter Oldershaw distillation column containing 51 trays, while 5000 grams per hour of n-octane are simultaneously introduced at the 6th tray from the top of the column. Heat is supplied to the column so that the temperature is maintained at about 74° C. at the top of the column, at about 85° C. at the crude mixture feed tray, and about 109° C. at the reboiler. The reflux ratio is kept at about 45 to 1.

The overhead product contains of about 55% by weight methacrolein, 40% by weight methanal and 5% butadiene monoxide. Bottoms from the extractive distillation column containing only n-octane and butadiene monoxide (of substantially the same quantity of butadiene monoxide in the crude feed) are fed simultaneously to the 15th tray from the top of another Oldershaw column of 2 inch diameter and containing 26 total trays. This column is operated at a reflux ratio of 6.5 to 1. Heat is supplied to the reboiler to maintain an overhead temperature of 67° C., a feed tray temperature of 115° C. and a reboiler temperature of 125° C. The overhead product consists essentially of 99.9+% by weight of butadiene monoxide. The bottoms product of this solvent stripping column is continuously recycled back to the solvent feed tray of the extractive distillation column.

Various other modifications of this invention will occur to those skilled in the art without departing from the spirit and scope thereof.

We claim:

1. Process for the separation of olefin oxides from a crude mixture comprising olefin oxides having from 3 to 18 carbon atoms and oxygenated impurities boiling within 5° C. of said olefin oxides which comprises subjecting said crude mixture to extractive distillation using an extractive solvent selected from the group of hydrocarbons consisting of paraffins and paraffinic naphthas having from 6 to 18 carbon atoms and having a boiling point of at least 35° C. higher than that of any of said oxygenated impurities, removing said oxygenated impurities overhead while removing said extractive solvent containing said olefin oxide as bottoms.

2. Process according to claim 1 wherein said olefin oxide is stripped from said bottoms and said extractive solvent is recycled for continuous use in said extractive distillation.

3. Process for the separation of propylene oxide from a crude mixture containing propylene oxide and oxygenated impurities boiling within 5° C. of said propylene oxide which comprises subjecting said crude mixture to extractive distillation using an extractive solvent selected from the group of hydrocarbons consisting of paraffins and paraffinic naphthas having from 3 to 18 carbon atoms and having a boiling point of at least 35° C. higher than that of any of said oxygenated impurities, removing said oxygenated impurities overhead while removing said extractive solvent containing said propylene oxide as bottoms.

4. Process according to claim 3 wherein said crude mixture containing propylene oxide is free of methylal.

5. Process for the separation of propylene oxide from a crude mixture containing propylene oxide and methyl formate which comprises subjecting said crude mixture to extractive distillation using an extractive solvent selected from the group of hydrocarbons consisting of paraffins and paraffinic naphthas having from 6 to 18 carbon atoms and having a boiling point of at least 35° C. higher than that of said methyl formate, removing said methyl formate overhead while removing said extractive solvent containing said propylene oxide as bottoms, stripping said propylene oxide from said entraining agent and recycling said extractive solvent for continuous use in said extractive distillation.

6. Process according to claim 5 wherein said crude mixture containing propylene oxide is free of methylal.

7. Process according to claim 6 wherein said extractive solvent is a paraffinic naphtha consisting essentially of a mixture of $C_7$ and $C_8$ paraffins boiling within the range of from 85° C. to 95° C.

8. Process according to claim 6 wherein said extractive solvent is n-heptane.

9. Process according to claim 1 wherein said olefin oxides contain from 3 to 8 carbon atoms and said extractive solvent contain from 6 to 18 carbon atoms.

10. Process according to claim 9 wherein said olefin oxide is butadiene oxide.

11. Process according to claim 9 wherein said olefin oxide is styrene oxide.

References Cited

UNITED STATES PATENTS

| | | | |
|---|---|---|---|
| 2,903,465 | 9/1959 | Suter et al. | 203—69 |
| 3,039,940 | 6/1962 | Prinz et al. | 203—70 |

NORMAN YUDKOFF, *Primary Examiner.*

WILBUR L. BASCOMB, Jr., *Assistant Examiner.*

PO-1050
(5/69)

UNITED STATES PATENT OFFICE
CERTIFICATE OF CORRECTION

Patent No. 3,338,800    Dated August 29, 1967

Inventor(s) R. C. Binning Et Al

It is certified that error appears in the above-identified patent and that said Letters Patent are hereby corrected as shown below:

Column 8, line 2, "methanol" should be --methanal--
    See spec page 16, line 9.

Column 8, line 54, "3" should be --6--.
    See spec Claim 3.

SIGNED AND
SEALED
JUN 23 1970

(SEAL)
Attest:

Edward M. Fletcher, Jr.
Attesting Officer

WILLIAM E. SCHUYLER, JR.
Commissioner of Patents